United States Patent
Metala et al.

(10) Patent No.: US 9,177,371 B2
(45) Date of Patent: Nov. 3, 2015

(54) NON-DESTRUCTIVE EXAMINATION DATA VISUALIZATION AND ANALYSIS

(75) Inventors: Michael J. Metala, Murrysville, PA (US); Waheed A. Abbasi, Murrysville, PA (US)

(73) Assignee: Siemens Energy, Inc., Orlando, FL (US)

(*) Notice: Subject to any disclaimer, the term of this patent is extended or adjusted under 35 U.S.C. 154(b) by 1309 days.

(21) Appl. No.: 12/469,809

(22) Filed: May 21, 2009

(65) Prior Publication Data

US 2009/0307628 A1   Dec. 10, 2009

Related U.S. Application Data

(60) Provisional application No. 61/059,843, filed on Jun. 9, 2008.

(51) Int. Cl.
*G06T 19/00* (2011.01)
*G06T 7/00* (2006.01)

(52) U.S. Cl.
CPC .............. *G06T 7/0006* (2013.01); *G06T 19/00* (2013.01); *G06T 2200/24* (2013.01); *G06T 2207/30164* (2013.01); *G06T 2219/012* (2013.01); *G06T 2219/028* (2013.01)

(58) Field of Classification Search
CPC ........... G06T 2207/20221; G06T 2207/30108; G06T 15/08; G06T 7/0097; G06K 2209/19
USPC ........................................................ 715/771
See application file for complete search history.

(56) References Cited

U.S. PATENT DOCUMENTS

| | | | |
|---|---|---|---|
| 4,755,753 A | 7/1988 | Chern | |
| 4,821,204 A | 4/1989 | Huschelrath | |
| 4,855,677 A | 8/1989 | Clark, Jr. et al. | |
| 5,028,100 A | 7/1991 | Valleau et al. | |
| 5,750,895 A * | 5/1998 | Chern et al. | 73/614 |
| 5,803,082 A * | 9/1998 | Stapleton et al. | 600/407 |
| 5,895,439 A | 4/1999 | Fisher et al. | |

(Continued)

FOREIGN PATENT DOCUMENTS

| | | |
|---|---|---|
| CN | 1825056 A | 4/2006 |
| CN | 101021507 A | 8/2007 |
| WO | WO 2004095378 A1 * | 11/2004 |

OTHER PUBLICATIONS

B J Matuszewski', L-K Shark', J P Smith', M R Varley' Automatic Fusion of Multiple Non-Destructive Testing Images and Cad Models for Industrial Inspection Image Processing and its Applications, Conference Publication No. 465 0 IEE 1999.*

(Continued)

*Primary Examiner* — Ajay Bhatia
*Assistant Examiner* — Phoebe Pan

(57) ABSTRACT

Interactive virtual inspection of modeled objects is provided. A graphic user interface facilitates interaction between a Data Visualization and Analysis application and the inspector. The Data Visualization and Analysis application acquires non-destructive examination data that is collected with reference to an industrial component under evaluation. The acquired non-destructive examination data is transformed into a visualization defined by a volumetric representation that is rendered on at least one display device as at least one view representative of the component under evaluation. The inspector may navigate the volumetric representation to investigate the integrity of the industrial component including non-surface conditions thereof.

14 Claims, 12 Drawing Sheets

(56) References Cited

U.S. PATENT DOCUMENTS

| | | | |
|---|---|---|---|
| 6,186,006 B1* | 2/2001 | Schmitz et al. | 73/598 |
| 6,341,153 B1 | 1/2002 | Rivera et al. | |
| 6,775,404 B1* | 8/2004 | Pagoulatos et al. | 382/154 |
| 6,860,853 B2* | 3/2005 | Hashimoto | 600/446 |
| 6,925,145 B2* | 8/2005 | Batzinger et al. | 378/59 |
| 7,272,254 B2 | 9/2007 | Shankarappa et al. | |
| 7,370,534 B2* | 5/2008 | Lasser et al. | 73/602 |
| 7,578,178 B2* | 8/2009 | Boyer et al. | 73/112.01 |
| 7,587,943 B2* | 9/2009 | Wiggenhauser et al. | 73/625 |
| 7,840,367 B2* | 11/2010 | Little et al. | 702/95 |
| 7,918,141 B1* | 4/2011 | Sathish et al. | 73/800 |
| 8,004,516 B2* | 8/2011 | Matsumoto | 345/419 |
| 8,010,315 B2* | 8/2011 | Wu et al. | 702/152 |
| 8,060,835 B2* | 11/2011 | Newcomer et al. | 715/782 |
| 8,109,147 B2* | 2/2012 | Kroning et al. | 73/628 |
| 8,179,132 B2* | 5/2012 | Wu et al. | 324/238 |
| 8,240,210 B2* | 8/2012 | Wu et al. | 73/601 |
| 8,244,025 B2* | 8/2012 | Davis et al. | 382/154 |
| 8,290,303 B2* | 10/2012 | Washburn et al. | 382/294 |
| 2004/0230613 A1 | 11/2004 | Goldstein et al. | |
| 2005/0041775 A1* | 2/2005 | Batzinger et al. | 378/59 |
| 2005/0078858 A1* | 4/2005 | Yao et al. | 382/128 |
| 2007/0160282 A1* | 7/2007 | Nightingale et al. | 382/152 |
| 2007/0217621 A1 | 9/2007 | Takumai | |
| 2007/0217672 A1 | 9/2007 | Shannon et al. | |
| 2008/0008367 A1* | 1/2008 | Franaszek et al. | 382/128 |
| 2008/0079723 A1* | 4/2008 | Hanson et al. | 345/427 |
| 2008/0111074 A1* | 5/2008 | Weir et al. | 250/338.1 |
| 2008/0247635 A1* | 10/2008 | Davis et al. | 382/152 |
| 2008/0247636 A1* | 10/2008 | Davis et al. | 382/152 |
| 2009/0009191 A1* | 1/2009 | Little, Jr. | 324/639 |
| 2009/0138231 A1* | 5/2009 | Little et al. | 702/152 |
| 2010/0126277 A1* | 5/2010 | Wu et al. | 73/602 |
| 2010/0205816 A1* | 8/2010 | Wu et al. | 33/503 |
| 2010/0207619 A1* | 8/2010 | Wu et al. | 324/238 |
| 2010/0324875 A1* | 12/2010 | Kalili | 703/11 |

OTHER PUBLICATIONS

G. Pichenot1, F. Buvat1, V. Maillot2 and H. Voillaume3 Eddy Current Modelling for Nondestructive Testing Proceedings of the 16th World conference on nondestructive testing. Montreal, 2004.*

Roberts; "On Encouraging Coupled Views for Visualization Exploration"; Published in Proceedings of the SPIE—The International Society for Optical Engineering, vol. 3643, Jan. 1, 1999; pp. 14-24; (XP-008090073).

Castanie et al.; "VolumeExplorer: Roaming Large Volumes To Couple Visualization and Data Processing for Oil and Gas Exploration"; Published in Visualization, 2005, VIS 05. IEEE Minneapolis, Oct. 23, 2005; pp. 247-254; (XP-10853169).

Liu et al.; "Survey: State of the Art in NDE Data Fusion Techniques"; Published in IEEE Transactions on Instrumentation and Measurement, IEEE Service Center, vol. 56, No. 6, Dec. 1, 2007; pp. 2435-2451; (XP-11197794).

Gross et al.; "Fusion of Multiprobe NDT Data for ROV Inspection"; Published in Oceans '95. MTS/IEEE. Challenges of our Changing Global Environment. Conference Proceedings, vol. 3, Oct. 9, 1995; pp. 2046-2050; (XP-10197675).

Huang et al.; "Visualizing Industrial CT Volume Data for Nondestructive Testing Applications"; Published in Vis 2003, IEEE Visualization 2003 Proceedings, Annual IEEE Conference on Visualization, Jan. 1, 2003; pp. 547-554; (XP-31173543).

* cited by examiner

154A

154B

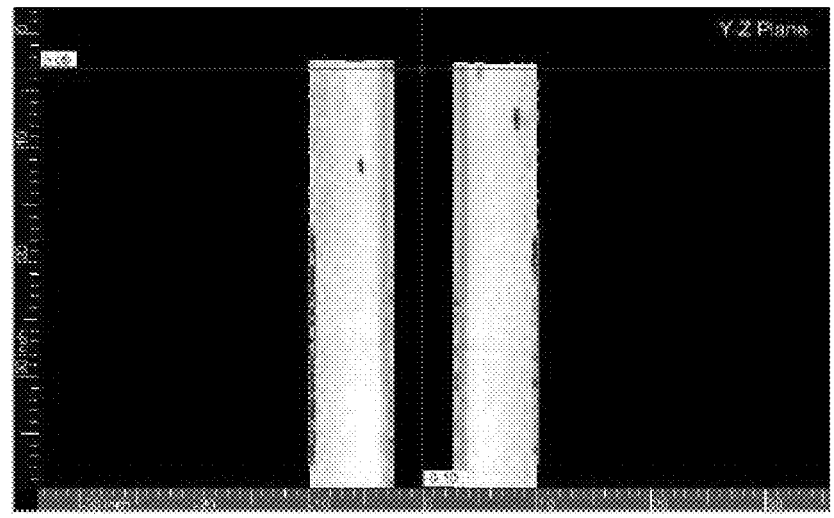
154C  Fig. 5C
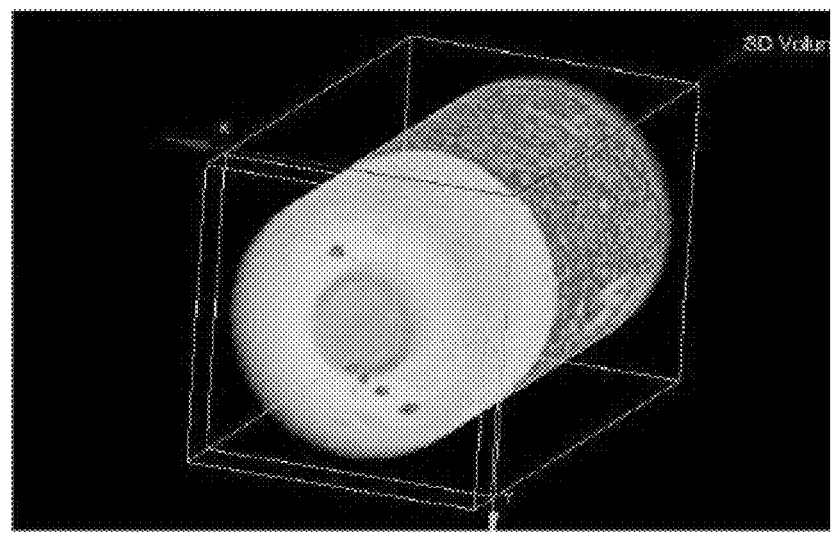
154D  Fig. 5D

154A

154B

154C

154D

NON-DESTRUCTIVE EXAMINATION DATA VISUALIZATION AND ANALYSIS

CROSS-REFERENCE TO RELATED APPLICATION

This application claims the benefit of U.S. Provisional Application Ser. No. 61/059,843, entitled A METHOD FOR NON-DESTRUCTIVE EXAMINATION (NDE) DATA VISUALIZATION AND ANALYSIS, filed Jun. 9, 2008, the entire disclosure of which is incorporated by reference herein.

FIELD OF THE INVENTION

This invention relates generally to the field of nondestructive evaluation of industrial components, and more particularly, to computer aided display, visualization and/or manipulation of non-destructive examination data acquired for determining the integrity of an industrial component under evaluation.

BACKGROUND OF THE INVENTION

Non-destructive Examinations are typically performed to inspect the integrity of industrial components such as turbine/generator blades, discs and other components exposed to operational service stress. In particular, non-destructive examinations are conducted in an attempt to mitigate the likelihood of a catastrophic failure due to materials degradation as a result of a component's exposure to its service environment.

Indications of potential future failure, if present in the materials of the component under test, are typically identified and evaluated by a human inspector. In general, the inspector utilizes one or more non-destructive examination methods to obtain inspection data, which includes measurements of the component being inspected. After collecting the data, the inspector must spend considerable amounts of time managing the data. The inspector must also spend considerable amounts of time performing data analysis to ascertain from the collected data, whether there are discontinuities in the material of the component under test. If discontinuities are detected in the component under test, the inspector must then attempt to determine the size and extent of the detected discontinuities to assess the overall integrity of the component. Based upon the inspection results, the inspector may also make assessments as to the expected in-service lifetime of the component.

Performing material discontinuity determinations is not a trivial task. Industrial component inspections require engineering know-how as well as significant amounts of experience inspecting components. Even an experienced inspector with extensive know-how is often required to make assumptions, especially when investigating whether a component exhibits a non-surface discontinuity. As such, common practice dictates incorporating safety factors into the inspection criteria established by the inspector to make a representative assessment of a given component under test. In this regard, a high degree of conservatism and subjectivity is often placed into the component inspection process.

SUMMARY OF THE INVENTION

According to aspects of the present invention, systems, methods and/or computer program products are provided for assessing and interpreting non-destructive examination data collected with regard to a component under evaluation. Non-destructive examination data associated with an industrial component under evaluation is initially acquired. In this regard, the non-destructive examination data includes a plurality of measurands that are derived from at least one non-destructive examination method that measures conditions of the component under evaluation, which may include non-surface conditions thereof. Position information that associates the collected measurands to corresponding positions associated with the component under evaluation is also acquired.

The measurands and corresponding position information are automatically transformed by a computer processor from data that is not in a format representative of an image of the component under evaluation into a visualization defined by a volumetric representation that is rendered on at least one display device as at least one view representative of the component under evaluation.

Moreover, a graphical user interface is provided that may be utilized by an inspector. The graphical user interface interacts with the processor to navigate the volumetric representation to investigate the integrity of the industrial component including non-surface conditions thereof. For example, at least one view of the visualization may be adjusted to display a representation of at least a portion of the component under evaluation. Indications of discontinuities within at least one view that represents flaws associated with the structure of the industrial component under evaluation that are not of interest may also be distinguished from flaws of interest to an inspector. Still further, the graphical user interface may be utilized to measure at least one of a size, location and orientation of each detected indication of a discontinuity that is of interest to the inspector.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 5C is a graphic illustration of the view of the Y-Z plane in the screen shot of FIG. 5;

FIG. 5D is a graphic illustration of the view of the 3D Volume plane in the screen shot of FIG. 5;

DETAILED DESCRIPTION OF THE INVENTION

As noted in greater detail herein, conventional material discontinuity determination is not a trivial task. Rather, industrial component inspections currently require engineering know-how as well as significant amounts of experience inspecting components. Moreover, due at least in part, to the precision of currently available non-destructive examination methods, even an experienced inspector with extensive know-how is often required to make assumptions and incorporate relatively large tolerance safety factors into their assessments. Thus, a high degree of conservatism and subjectivity is often placed into the component inspection process. Still further, an inspector using conventional non-destructive examination methods must spend significant amounts of time and effort after collecting the inspection data to perform data reduction, data interpretation, and data analysis before an assessment may be issued. As such, an inspection process can require relatively long periods of time to complete. As inspections become more complex, higher operator skill is required.

However, according to various aspects of the present, invention, an inspection and analysis framework provides reliable and accurate tools that an engineer/inspector may use to assess and interpret data obtained from non-destructive examinations of a component under evaluation. The framework may also reduce the complexity of the inspection results presented to the engineer/inspector, e.g., by transforming collected data into a volumetric representation of the component under evaluation that may be manipulated by the engineer/inspector. By automating the display and presentation of non-destructive examination data, the operator is not required to spend significant amounts of time performing laborious data reduction. Moreover, by enabling the inspector to manipulate a volumetric representation of the component, more accurate assessments may be issued by the inspector. The framework may also facilitate immediate display of collected data thus enabling preliminary engineering analysis to be performed on the component under evaluation, or the collected data can be preserved for subsequent processing. In this regard, non-destructive examination data may be collected over a period of time such that historical information may be considered in the structural integrity analysis performed by the inspector.

According to further aspects of the present invention, data from multiple sensors and/or from multiple non-destructive examination methods can be fused together to further assist the engineer/inspector in assessing the structural integrity of the component under evaluation. Still further, the fusing of different sensor measurements and/or measurements from different methods may be implemented on the fly to facilitate interaction with the inspector.

Figure 1:
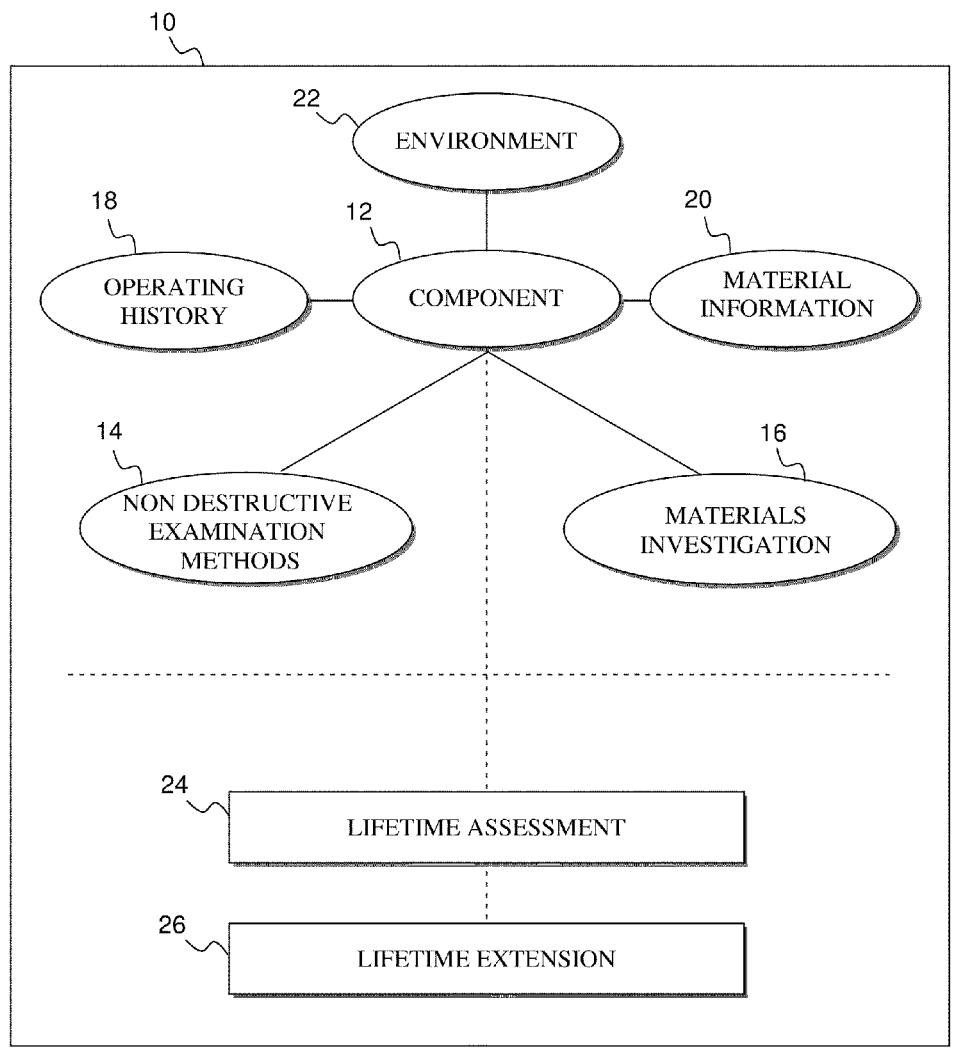
FIG. 1 is a block diagram illustrating an exemplary perspective including processes and/or resources that may be utilized for inspecting and/or assessing industrial components according to various aspects of the present invention.

Referring now to the drawings, and in particular, to FIG. 1, a block diagram 10 illustrates an exemplary perspective that includes processes and/or resources that may be utilized for inspecting and/or assessing an industrial component 12 according to various aspects of the present invention. In general, an inspector may periodically perform a non-destructive evaluation to assess the suitability of the industrial component 12 for service in its intended service environment. By way of illustration and not by way of limitation, the industrial component 12 may comprise a generator component such as a turbine/generator blade, disc, etc. In this regard, the period in which the component 12 is inspected/re-inspected may be on the order of every few years or less. The period in which the component 12 is inspected/re-inspected may alternatively be on the order of every few years up to a decade or more. Factors that may affect a given re-inspection period may include for example, previous inspection results, the amount of in-service stress and use of the industrial component 12, and other factors.

When performing a component evaluation, an inspector may utilize one or more non-destructive examination methods 14 to obtain inspection data. The inspector uses the obtained inspection data and optionally, other obtained information, to determine whether there are detectable indicators such as discontinuities (i.e., flaws) in the industrial component 12 that are indicative of a failure or likelihood of a future failure of the industrial component 12. Each non-destructive examination method 14 takes advantage of "non-destructive" techniques, e.g., testing techniques that do not materially affect the useful life of the component 12 under test. Keeping with the above-example of a turbine/generator component, a non-destructive examination method 14 may serve as an integral process for disc bore inspections, blade attachment inspections, blade root inspections, solid rotor inspections, generator rotor re-qualifications, and other tasks performed during the service life of the associated turbine/generator. Several exemplary non-destructive methods are described in greater detail herein.

In certain applications, it is recognized that not all discontinuities will affect the service life of the industrial component 12 or otherwise require immediate action. As such, the inspector may collect, aggregate, evaluate, process, archive or otherwise consider data that is gathered with regard to a number of aspects, e.g., features or characteristics related to the industrial component 12. For example, the inspector may implement a materials investigation 16 that collects data associated with the material composition of the industrial component 12. The inspector may further consider the operating history 18 of the component 12 and/or the inspector may consider other information 20 deemed material to the analysis of the component 12. Still further, the inspector may consider data collected with regard to the environment 22 of the component 12.

The results of the materials investigation may also influence down-stream related processes such as a lifetime assessment 24 of the industrial component 12 and/or a prediction of the lifetime extension 26 of the industrial component 12. In this regard, the analysis associated with the lifetime assessment 24 and/or lifetime extension 26 may be implemented as separate processes, or they may share resources with, integrate with, and/or be implemented as part of the materials investigation according to various aspects of the present invention, as will be described in greater detail herein.

Figure 2:
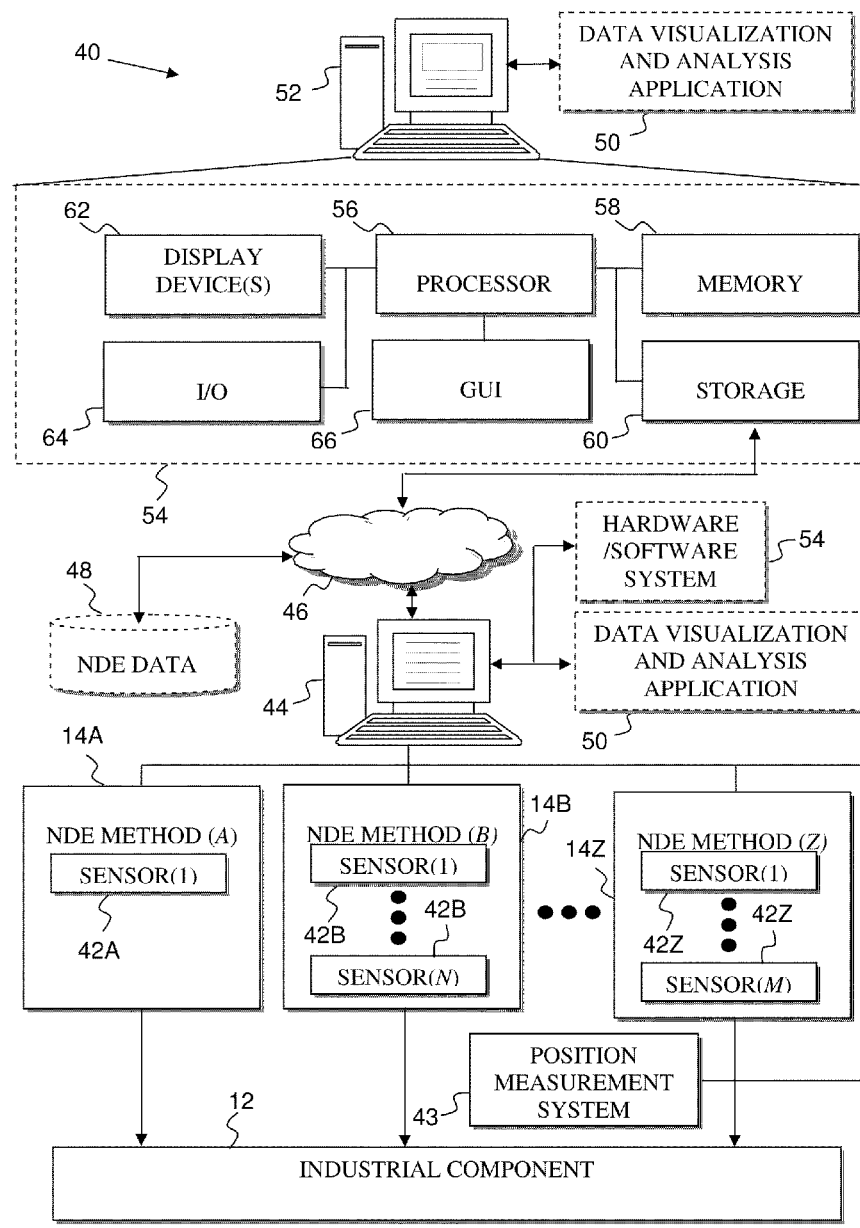
FIG. 2 is a block diagram illustrating several exemplary components of an inspection and analysis framework according to various aspects of the present invention, including memory and/or storage for storing computer code that implements software aspects of the present invention.

Referring now to FIG. 2, an exemplary system 40 including hardware and software is illustrated for performing non-destructive testing and evaluation according to various aspects of the present invention. The industrial component 12 is inspected using one or more non-destructive evaluation methods, denoted generally by the reference numeral 14. In this regard, the industrial component 12 may be a large component such as a generator rotor, which can weigh potentially hundreds of tons. As such, it may only be practical to collect inspection data on-site. Alternatively, for smaller industrial components, it may be possible to transport the industrial component to a testing facility.

Regardless of whether testing is done on-site or at a dedicated testing facility, each non-destructive examination method 14 may utilize one or more sensors, denoted generally by the reference numeral 42. As used herein, a sensor may comprise any device for collecting non-destructive examination data, as the particular inspection task requires. By way of illustration, exemplary sensors may include one or more of a mechanical or optical sensor, a penetrating radiation device, an electromagnetic device, a sonic or ultrasonic device, a thermal device, etc.

By way of illustration, the non-destructive examination method(s) 14 may comprise utilizing: an ultrasonic testing apparatus (UT), an impulse excitation (or electromagnetic) technique (ET) system, a magnetic particle inspection (MT) system, a visual non-destructive inspection, Penetrant Testing (PT), a magnetic particle inspection, an Eddy Current inspection, an acoustic thermography inspection, an ultrasonic phased array inspection, an acoustic emission inspection, an induction thermography system, etc.

In practice, such non-destructive examination methods 14 may also be modified to conform to specific testing jigs as required by the particular application, e.g., where it may be beneficial to perform on-site evaluations. Moreover, the system may also include additional features and/or capabilities for processing the data. For example, depending upon the output capability of one or more sensors, scaling, conditioning, buffering or other signal processing capabilities may be required. Moreover, analog to digital conversion may also be required, e.g., where a given sensor outputs analog data.

By way of illustration, and not by way of limitation, a first non-destructive examination method 14A may comprise eddy current testing. Eddy current testing is based on inducing electron flow in electrically conductive material, through the rotor in the present example. Any discontinuity in the material, such as cracks, voids, etc., within the structure of the material disrupts the flow of the eddy currents and these disruptions are then captured and recorded. In this regard, the eddy current method may utilize a single sensor 42A, such as an eddy current probe to perform the inspection. Alternatively, a probe array may be utilized to combine several eddy current probes for simultaneous data collection. Regardless, each data measurement that is collected is described in terms of a single variable, i.e., measured eddy current value in this example. In order to derive positional information that associates the collected measurands from the eddy current probes to corresponding positions associated with the component under evaluation, an optional position measurement system 43 may also be used. For example, the position measurement system 43 may record or otherwise derive a position for each sensor at each sensor reading, e.g., using absolute measurements, relative measurements, offset measurements, etc. As an example, an eddy current probe may optionally be placed on linear stage 43 having an encoder so that position information is collected in association with the measurements of current by the eddy probe sensor(s).

As yet another example, a second non-destructive examination method 14B may comprise ultrasonic scanning. In this regard, one or more sensors, e.g., ultrasonic transducers 42B, are utilized to transmit ultrasonic information through the material of the industrial component 14. The ultrasonic information bounces off defects such as voids and other discontinuities and the reflected information is collected and stored. In the illustrative example of performing bore inspections, a plurality of ultrasonic sensors 42B may be mounted to a linear stage 43 that traverses the sensors 42B through a rotor bore to inspect the rotor structure.

The sensors 42B may also be coupled to a rotary stage so that the sensors 42B rotate as they axially extend through the bore hole (in this example). In this regard, positional information that associates the collected measurands from the ultrasonic sensors to corresponding positions associated with the component under evaluation may be recorded using an encoder on the linear stage to record axial position and angular position as a function of ultrasonic transducer measurement. Still further, each sensor may be oriented differently so that each sensor measures from the perspective of a different direction. For example, each sensor 42B may be arranged at a selected angle so that at least one sensor emits its ultrasonic signal in a direction that is not radially out from the bore hole. In this regard, information regarding orientation of the sensor may be associated with angular position, axial position and the value of the measurement.

Notably, the ultrasonic measurement data is in a completely different data format compared to the eddy current data. Regardless of whether using eddy current testing or ultrasonic scanning, the measurement data is not in a format representative of an image of the component under evaluation.

As shown, yet another non-destructive method 14Z is illustrated, which may have one or more sensors 42Z to imply that any number of different types of non-destructive examination methods 14 may be employed to gather data. Moreover, each non-destructive test method 14 may employ one or more sensors 42.

Upon completion of the one or more non-destructive test methods 14, there is likely to be a considerable amount of data that has been collected. Typically, the collected data can amount to gigabytes of information. Still further, depending upon the nature of the non-destructive test method(s) utilized, the data format of each test may be remarkably different.

The non-destructive data that has been gathered by the one or more non-destructive methods 14 can be stored locally, e.g., on a computer processing device 44 such as a general purpose computer, laptop, server computer or other suitable processing device. The non-destructive examination data may also be communicated across a network 46, e.g., a local area network, a wide area network, the Internet, etc., to a suitable storage location 48, e.g., a storage associated with a file server, a network addressable storage or other suitable storage configuration. Regardless of where the data is physically located, the computer processing device 44 may execute a data visualization and analysis application 50 to perform various functions of inspection and analysis. Moreover, the data visualization and analysis application 50 may be able to perform real-time data analysis, near real-time data analysis or post processing data analysis, e.g., depending upon the application, the desired workflow of the inspector, etc. The data visualization and analysis application 50 will be described in greater detail herein.

The collected non-destructive examination data may also/alternatively be analyzed by a computer that is positioned remote to the inspection methods 14. By way of illustration and not by way of limitation, a computer 52 may comprise a hardware/software system 54 that includes one or more processors 56 for executing the instructions of the data visualization and analysis application 50 and/or any components thereof. The system 54 may also include memory 58. The memory 58 may comprise a computer usable storage medium having computer usable program code embodied therewith, the computer usable program code comprising code to execute the data visualization and analysis application 50 which is executable by the processor(s) 56 as described in further detail herein. The system 54 may also comprise storage 60 for permanently or temporarily storing data files, configuration files, program code or anything else necessary to implement the features described herein.

The system 54 may also include one or more display devices 62 for displaying to the inspector, the generated analysis and/or inspection results, computations, views, images, and/or other visualizations, examples of which are set out in greater detail herein. The system 54 may still further include I/O 64, e.g. a keyboard, mouse, pointing device, speakers etc., which is necessary to facilitate user interaction with the software components of the data visualization and analysis application 50. Still further, the system 54 may include a graphical user interface 66 that facilitates interaction between the inspector and the data visualization and analysis application 50.

According to various aspects of the present invention, the processing capability of the framework may be extended to integrate test results from the various non-destructive examination methods and/or to combine non-destructive examination data with other forms of data collected for the same component under test. As inspections become more complex, higher skill level is needed to perform accurate testing and inspection of large industrial components. According to various aspects of the present invention, the data visualization and analysis application 50 may be utilized to reduce complexity of component inspection and analysis for the inspector by providing a tool that is capable of visualization and analysis of a component under evaluation.

Figure 3:
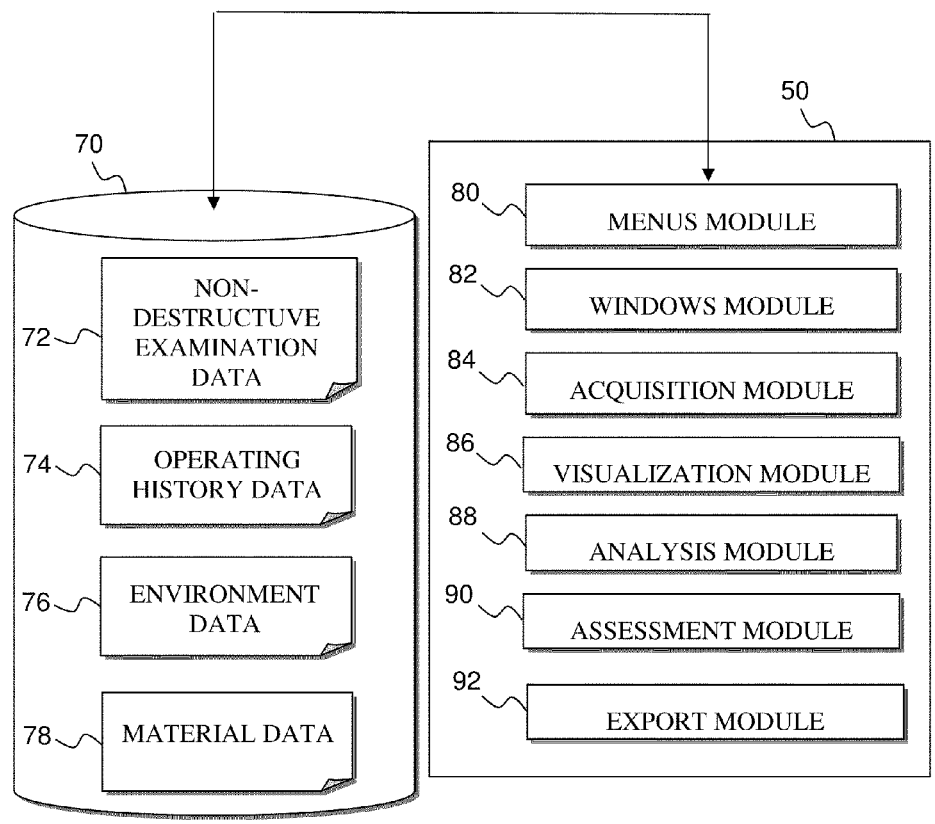
FIG. 3 is a block diagram illustrating several exemplary software components of an inspection and analysis framework according to various aspects of the present invention.

Referring to FIG. 3, several exemplary software components of an inspection and analysis framework are illustrated according to various aspects of the present invention. To facilitate inspector interaction with non-destructive examination data, the framework includes a data visualization and analysis application 50. The data visualization and analysis application 50 may be configured to process data extracted from one or more data sources 70, e.g., one or more databases, data files, etc. For example, with reference in general to FIGS. 1-3, the data visualization and analysis application 50 may utilize non-destructive examination data 72 collected utilizing one or more of the non-destructive examination methods 14 described with reference to FIGS. 1 and 2. The data visualization and analysis application 50 may also be configured to process operating history data 74, e.g., such as may be collected with regard to the operating history 18 of the component 12. Still further, the data visualization and analysis application 50 may be configured to process environmental data 76, e.g., such as may be collected with regard to the operating environment 22 of the component 12. Further yet, the data visualization and analysis application 50 may be configured to process materials data 78, e.g., such as may be collected with regard to the materials information 16.

The data visualization and analysis application 50 may interact with the graphical user interface 66 to facilitate interaction between the various modules of the data visualization and analysis application 50 and the inspector. For example, the graphical user interface 66 may allow an inspector to interact with various views of information corresponding to the industrial component 12 under evaluation, as will be described in greater detail herein.

As schematically illustrated, the data visualization and analysis application 50 may include one or more modules for performing various display, visualization and/or manipulation functions. The term "module" as used herein is riot intended to suggest any particular programming architecture, language or development approach. Rather, the term module is used for descriptive purposes, to describe logical groupings of functions that may be implemented according to various aspects of the present invention. In practice, the various features of the data visualization and analysis application 50 may be implemented utilizing any practical software techniques.

A menus module 80 functionally implements menu logic allowing the user to navigate to the various capabilities and features of the data visualization and analysis application 50 to perform operations on data related to the component 12 under evaluation. The menus module 80 may open in a separate window, in a side pane within a main operating window, etc., and provides options, drop down menu selections, etc. A windows module 82 functionally implements logic for defining windows in which various views of the component under evaluation may be graphically or textually represented. The windows may also provide an operating space for various commands and operational parameters as an operator interacts with the data visualization and analysis application 50.

An acquisition module 84 functionally acquires the data necessary to perform an inspection. For example, the acquisition module 84 may be configured to acquire non-destructive examination data that is collected with reference to an industrial component under evaluation, wherein the non-destructive examination data is utilized to characterize the integrity of the industrial component including surface and internal conditions.

Depending upon the specifically implemented features, the data acquisition module 84 may interact with one or more of the data source(s) 70. For example, the acquisition module 84 may support browsing, searching, filtering and other data management aspects that enable an operator to locate a desired operating history, environment data, material data, etc., associated with the component 12 under evaluation. The acquisition module 84 may also and/or alternatively facilitate interacting directly with the non-destructive examination methods 14, the position measurement system 43, or other testing machines, etc., such as where on-location inspections are being performed. The acquisition module 84 may also handle routine tasks that are necessary for moving data between a corresponding storage device or devices, e.g., data storage 48, memory 58, storage 60, etc., and the graphical user interface 66, such as by implementing any necessary compression, expansion, synchronization or other functions.

A corresponding visualization module 86 is provided for graphically displaying views of the component 12 under evaluation, e.g., by manipulating the data generated by the non-destructive testing methods 14 into viewable representations. According to various aspects of the present invention, the visualization module 86 via the corresponding computer processor may automatically transform the acquired non-destructive examination data, e.g., the acquired measurands from non-destructive examination methods 14 and corresponding position information, e.g., as collected by a position measurement system 43, from data that is not in a format representative of an image of the component under evaluation into a visualization that is rendered on at least one display device as at least one view of a volumetric representation of the component 12 under evaluation. For example, the visualization module 86 may characterize the data in at least one window illustrating a representation of the component in at least one two dimensional (2-D) view. Visual analysis of the 2-D view may provide sufficient information to distinguish an indication of a discontinuity of the industrial component 12 under evaluation if such an indication is present in the acquired non-destructive examination data. The visualization module 86 may also automatically transform the acquired non-destructive examination data into a volumetric representation in a three-dimensional (3-D) space such that data intensity and location/orientation may be visualized. Exemplary screen displays and examples of such views are described in greater detail herein.

In operation, the visualization module 86 may interact with the acquisition module 84 to display non-destructive examination data in one or more 2-D and/or 3-D views, e.g., such as may be necessary to view sections or slices along the component under evaluation. The visualization module 86 may also present views based upon non-destructive evaluation data from a single sensor 42/non-destructive examination method 14, or the views may represent data from multiple sources/testing methods that are fused together, as will be described in greater detail herein. Still further, collected data may be overlaid on the component, such as where a component computer aided design (CAD) model is available. The visualization module 86 also interacts with the menus module 80 and windows module 82 to control screen positioning of the corresponding views and commands implemented by the graphical user interface 66, e.g., user commands to manipulate the various views.

Still further, the visualization module 86 may interact with the windows module 82 to provide multiple display panes, e.g., X-Z, X-Y, Y-Z and 3-D panes may be arranged within a visualization workspace. Still further, each pane may have its own coordinates, scale, magnification, etc. and the visualization module 86 may allow high resolution zooming into areas of interest of the inspector, which may be viewed in one or more of the panes. Still further, software tools may provide the capability to implement on-screen measurements, such as the position, angle, intensity, etc.

The menus module 80, windows module 82, visualization module 86, etc. may thus interact with the display device(s) 62 to present the collected non-destructive examination data to the inspector for visual analysis.

An analysis module 88 functionally allows the operator to manipulate the data acquired from the non-destructive evaluations. In this regard, the analysis module 88 may be configured to allow a user to locate discontinuities such as flaws, etc., that may be useful in evaluating a failure, potential failure, or the likelihood of a future failure. The analysis module 88 may further allow the operator to identify a size, location and orientation of each detected indication of a discontinuity, wherein the integrity of the industrial component may be utilized, e.g., in a downstream process, to assess the service life of the industrial component being inspected.

To perform its function, the analysis module 88 may allow the inspector to interact with the collected non-destructive examination data to manipulate 2-D or 3-D non-destructive examination data views. This is particularly useful, for example, to identify discontinuities and to identify relationships between nearby discontinuities. In this regard, the ability to visualize discontinuities and relationships between nearby discontinuities may thus facilitate more detailed analysis. This enables the inspector to distinguish indications of discontinuities that represent flaws associated with the structure of the of the industrial component under evaluation that are not of interest, e.g., minor flaws that do not likely affect the usability of the component, from flaws of interest to an inspector, which may have an effect on the integrity of the component 14.

In this regard, the flaw analysis may be performed by a separate program, the flaw processing may be integrated into an inspection module, or any combination of programs may be utilized. For example, an optional assessment module 90 may also be provided, e.g., where assessment is not already provided in a separate application. The assessment module 90 comprises the tools necessary to determine the integrity of the industrial component under evaluation. The assessment module 90 may also incorporate features to enable assessment of the service life of the component 12. In addition to, or in lieu of the assessment module, an optional export module 92 may also be provided. The export module presents, packages, modifies, assembles and or otherwise prepares data within or otherwise available to the data visualization and analysis application 50 for export to a separate engineering analysis tool for component integrity determination.

As such, the data visualization and analysis application 50 integrates with the graphical user interface 66 and the processor 56 to enable an inspector to navigate the volumetric representation of a component under evaluation, e.g., to investigate the integrity of the industrial component including non-surface conditions thereof. The inspector may also interact with the various modules 80, 82, 84, 86, 88, 90 and 92, for example, to adjust at least one view of the visualization to display a representation of at least a portion of the component under evaluation, to distinguish indications of discontinuities within at least one view that represents flaws associated with the structure of the of the industrial component under evaluation that are not of interest from flaws of interest to the inspector and to measure at least one of a size, location and orientation of each detected indication of a discontinuity that is of interest to the inspector.

Although the visualization and analysis application 50 is described in general terms with reference to the various modules, other and/or additional modules may be provided depending upon the specific implementation. Moreover, the functions implemented by two or more modules may be combined or consolidated into fewer modules. The functions of each of the above identified modules may be also be changed, combined, simplified, expanded upon or otherwise varied based upon implementation and design requirements for a specific application. Moreover, as noted in greater detail herein, the display and visualization of acquired non-destructive examination data may be followed by the application of the collected data to data analysis and interpretation.

Figure 4:
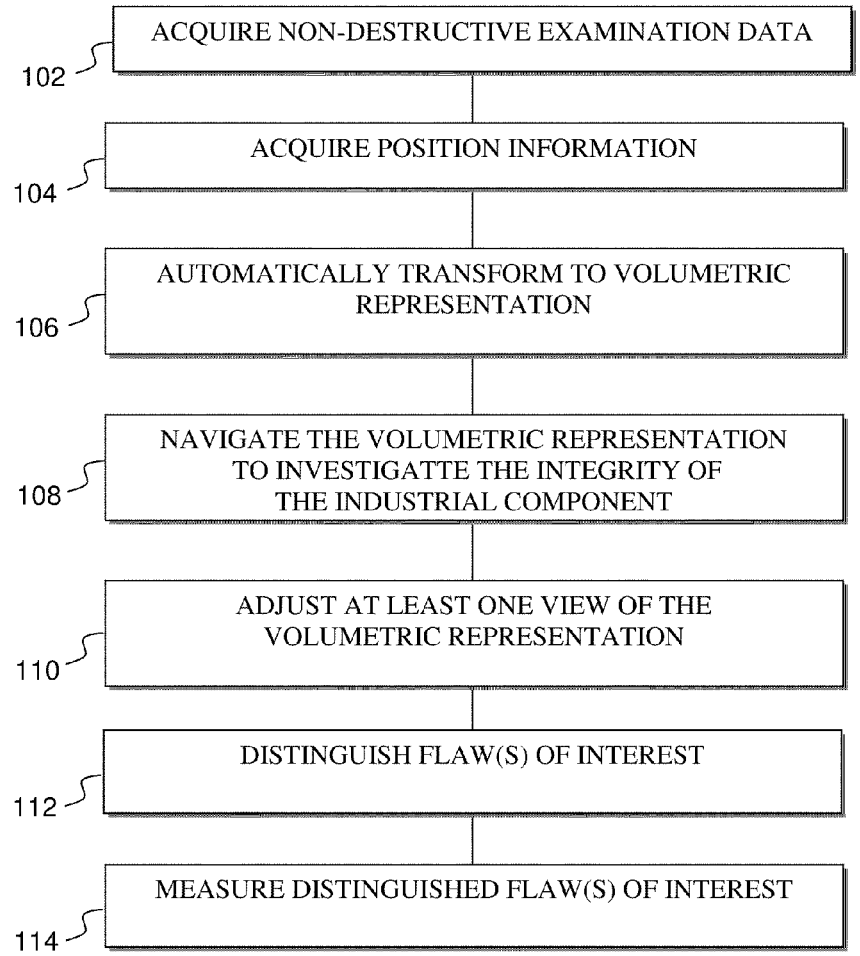
FIG. 4 is a flow chart illustrating a method of assessing the integrity of an industrial component under evaluation using the inspection and analysis framework of FIGS. 2 and 3, according to various aspects of the present invention.

Referring to FIG. 4, a method 100 for assessing and interpreting non-destructive examination data collected with regard to a component under evaluation is illustrated. The method 100 may be implemented, for example, by the framework including the data visualization and analysis application 50 described with reference to FIGS. 1 through 3. Non-destructive examination data is acquired at 102. The non-destructive examination data may be collected with reference to an industrial component under evaluation, where the non-destructive examination data includes a plurality of measurands that are derived from at least one non-destructive examination method that measures conditions of the component under evaluation, which may include non-surface conditions thereof. As various non-destructive methods 14 produce different types of non-destructive data, the acquired data is referred to herein as measurands to imply simply quantities determined by measurement. Position information is acquired at 104. For example, position information may be acquired, e.g., from the position measurement system 43, which associates the collected measurands to corresponding positions associated with the component under evaluation.

According to various aspects of the present invention, non-destructive examination data may be collected using non-destructive methods 14 including those described more fully herein with reference to FIGS. 1-3. In this regard, the acquired data may be derived from sensors, such as where on-site, substantially real-time testing is being implemented. Alternatively, non-destructive examination data, in its native form or in some other format may be loaded from a suitable storage medium. If data extracted from storage has already been manipulated, e.g., by the data visualization and analysis application 50 during a subsequent evaluation, the data may also include annotations, metadata, secondary data files, etc. to preserve data from earlier evaluations. As such, the display and inspection process may be built based upon historical reference data, collected on the actual part, as described more fully herein with reference to FIGS. 1-3.

The acquired non-destructive examination data is automatically transformed at 106 by a computer processor to a volumetric representation. For example, a computer processor may automatically transform the acquired measurands and corresponding position information from data that is not in a format representative of an image of the component under evaluation into a visualization defined by a volumetric representation that is rendered on at least one display device as at least one view representative of the component under evaluation.

The transformation may require extensive data reduction, compression and/or other data processing. Further, data may be displayed for example, in one or more 2-D and/or 3-D views that can be manipulated by the inspector as described more fully herein. The transformation may be implemented, for example, by the visualization module 86 of the data visualization and analysis application 50 as executed by the processor 56 of the system 54, as illustrated in FIGS. 1-3.

The method 100 further comprises navigating the volumetric representation to investigate the integrity of the industrial component at 108. As an illustrative example, an inspector may utilize a graphical user interface 66 that interacts with the processor 56 to navigate the volumetric representation of the non-destructive examination data within an application such as the data visualization and analysis application 50, to investigate the integrity of the industrial component 12 including non-surface conditions thereof.

In this regard, investigation of the integrity of the component may comprise adjusting at least one view of the volumetric representation at 110. For example, the method may comprise adjusting at least one view of the visualization to display a representation of at least a portion of the component under evaluation. By way of illustration, by adjusting one or more views of the visualization, the component under evaluation can be examined for discontinuities in dimensions that define location/position/orientation as well as intensity. In this regard, the analysis is capable of distinguishing location and relative orientation of a first indication of discontinuity relative to one or more neighboring discontinuities, if present.

Thus, the method 100 further comprises distinguishing flaws of interest at 112. That is, the method 100 further comprises distinguishing indications of discontinuities within at least one view that represents flaws associated with the structure of the industrial component under evaluation that are not of interest to the inspector from flaws that are of interest to the inspector. The method 100 still further comprises measuring the distinguished flaws at 114, which are of interest to the inspector. For example, flaws of interest may be evaluated utilizing the graphical user interface to measure at least one of a size, location and orientation of each detected indication of a discontinuity that is of interest to the inspector.

For example, according to various aspects of the present invention, the display provides a visual representation of the indication of discontinuities, if present in the non-destructive examination data. As such, the data visualization and analysis application 50 may include tools, e.g., as provided by the analysis module 88, that enable the manipulation of the component data, to provide, measure, evaluate, predict, etc., the size, orientation and location of detected discontinuities.

Exemplary discontinuities might comprise, for example, a crack from service stress, a through-crack, surface flaw, dimensional change, density change, detection of a foreign object, misalignment, missing part, void, corrosion, or other distinguishable features or flaws that would or could influence the service life of the component under evaluation.

Still further, it may be possible to acquire a three-dimensional component model of the industrial component under evaluation. In this regard, the 3-D view may be overlaid onto the component model to assist in visualizing defect location.

Figure 5:
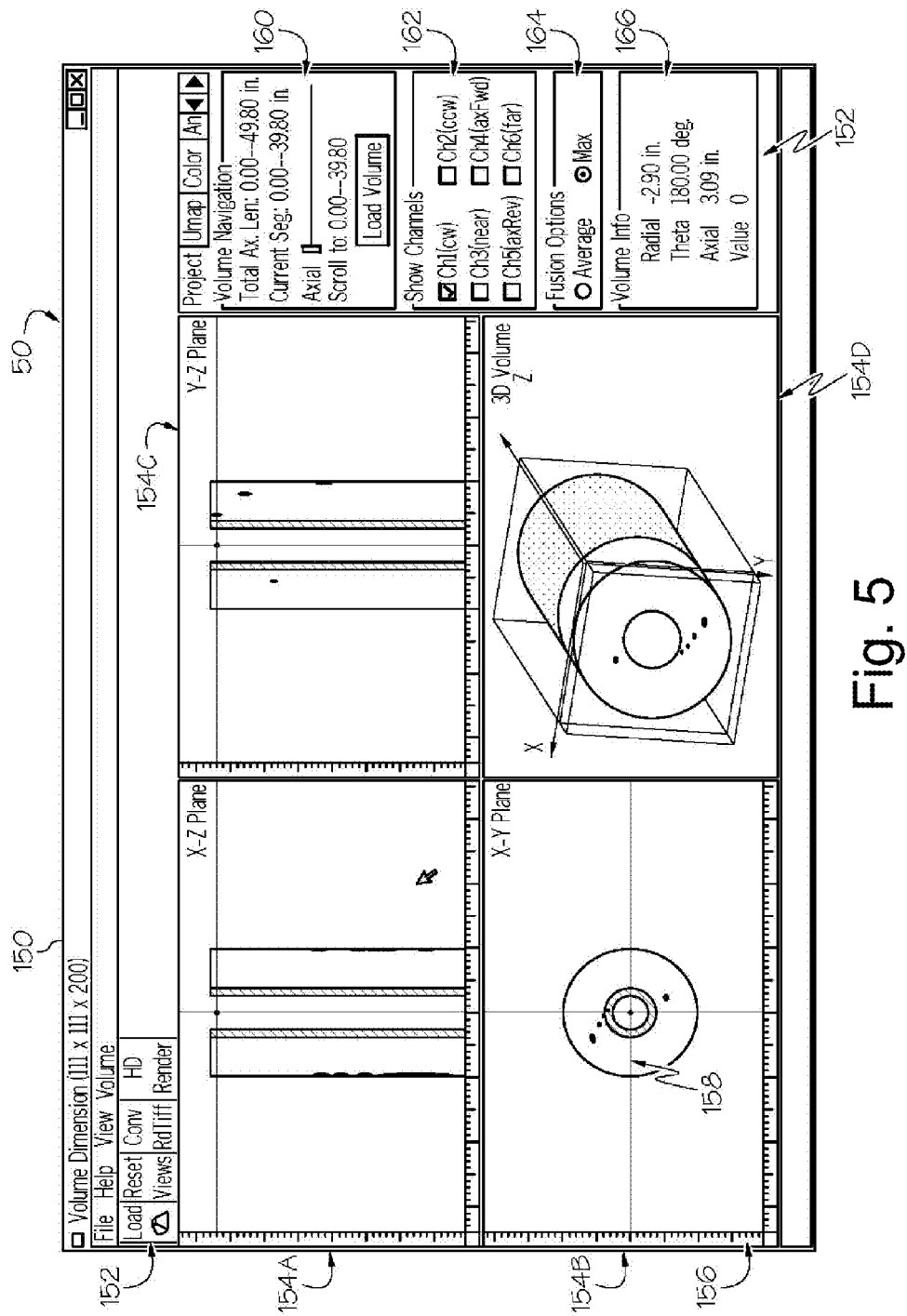
FIG. 5 is an exemplary screen shot of a user interface screen for performing component inspections according to various aspects of the present invention.
Figure 5A:
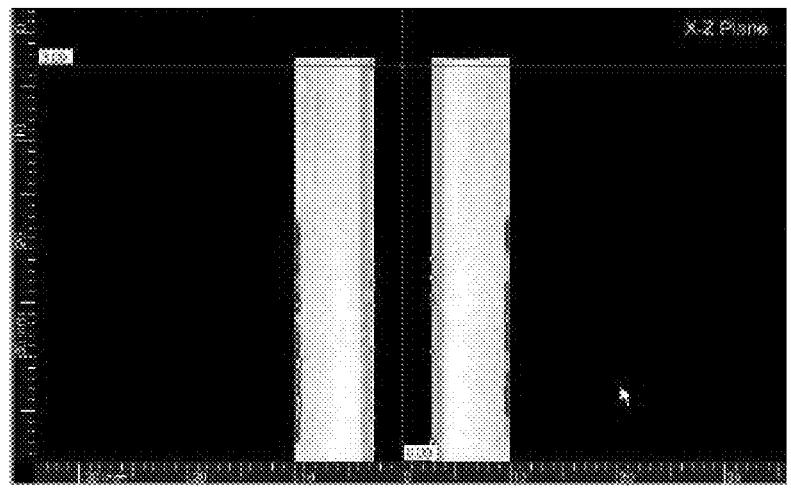
FIG. 5A is a graphic illustration of the view of the X-Z plane in the screen shot of FIG. 5.
Figure 5B:
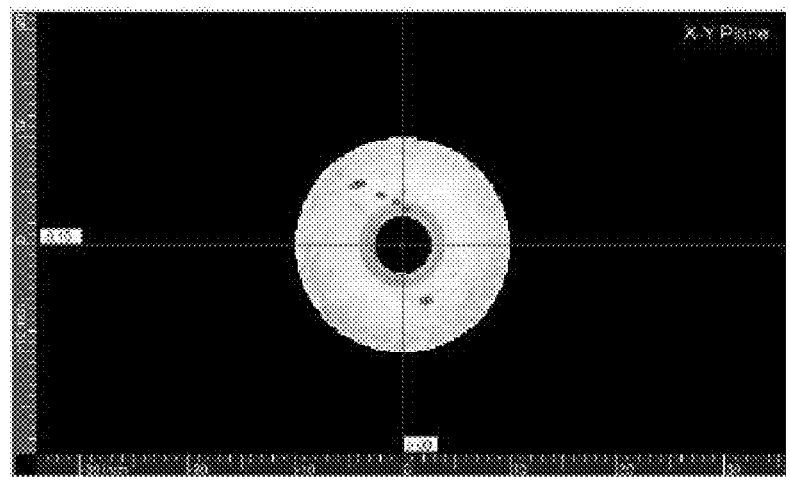
FIG. 5B is a graphic illustration of the view of the X-Y plane in the screen shot of FIG. 5.

Referring to FIG. 5, a screenshot 150 illustrates an exemplary implementation of select features of the data visualization and analysis application 50 according to various aspects of the present invention. The application 50 presents a plurality of menus 152 to the inspector, e.g., as may be derived by the menu module 80. In this regard, the menus may be drop down, tabbed view, dialog boxes, etc. to convey to the inspector, the available processing options. The application also presents a plurality of windows 154A-154D to the inspector, e.g., as may be derived by the windows module 82. By way of illustration, the first window 154A is provided to visualize a 2-D representation of the component 12 under inspection in an X-Z plane, which is also illustrated in detail, in FIG. 5A. The second window 154B is provided to visualize a 2-D representation of the component in an X-Y plane, which is also illustrated in detail, in FIG. 5B. Correspondingly, the third window 154C is provided to visualize a 2-D representation of the component in a Y-Z plane, which is also illustrated in detail, in FIG. 5C. The fourth window 154D is provided to visualize a 3-D representation of the component in a 3-D volumetric view, which is also illustrated in detail, in FIG. 5D.

Thus, as illustrated generally by FIGS. 5, 5A, 5B, 5C and 5D, the data visualization and analysis application 50 has acquired non-destructive examination data that is collected with reference to an industrial component under evaluation. The non-destructive examination data is derived from at least one non-destructive examination method that scans for conditions of the component under evaluation, which may include non-surface conditions thereof, as described more fully herein. In this regard, it is likely that the sensor data from the non-destructive examination method(s) is likely incapable of generating an image representation of the component being inspected. For example, ultrasonic data is simply recorded as a measure of reflected signals that are transmitted by a piezo element.

However, according to various aspects of the invention, additional information is captured along with the sensor data, e.g., positional information from translation stages, etc. that may physically move the sensors relative to the component under evaluation. As such, encoder position data, which may comprise axial data, rotational data etc., is commingled with the sensor data to derive the views shown in the windows 154A-154D. Moreover, it is likely that an extremely large amount of data is collected, which cannot all be displayed. According to an aspect of the present invention, the acquisition module 86 may implement data grooming, compression, filtering and other data techniques processing techniques select the data appropriate for display in the windows 154A-154D.

As noted in greater detail above, the computer processor 56 automatically transforms the acquired non-destructive examination data from data that is not in a format representative of an image of the component under evaluation into a visualization representing at least one view of a volumetric representation of the component under evaluation. For example, the component is visualized and is displayed in the windows 154A-154D, e.g., as may be displayed on one or more display devices 62, e.g., by the visualization module 86.

The inspector may then use a graphical user interface 66 to interact with the processor 56 to manipulate the views of the component data. For example, the inspector may navigate the volumetric representation to investigate the integrity of the industrial component including non-surface conditions thereof, by selecting different menus 152, changing menu options or setup parameters, etc., interacting with the data in the windows 154A-154D, etc., to manipulate the views of the component. Further, each window 154A-154D may include a scale 156, user-adjustable cross-hairs, and other tools for manipulating the views, including having the ability to rotate, zoom, expand and otherwise manipulate the data.

According to various aspects of the present invention, an inspector may utilize a graphical user interface 66 that interacts with the processor 56 to navigate the volumetric representation to investigate the integrity of the industrial component including non-surface conditions thereof by adjusting at least one view 154A-154D of the visualization to display at least a portion of image representing the component under evaluation, e.g., on a display device In this regard, an investigator may identify an indication of a discontinuity within the adjusted view that represents a flaw associated with the structure of the of the industrial component under evaluation that is of interest to the inspector if such an indication is present in the acquired non-destructive examination data.

Moreover, the inspector may utilize the graphical user interface 66 to measure at least one of a size, location and orientation of each detected indication of a discontinuity that is of interest to the inspector. For example, the menus 152, e.g., as located along the right-hand column in the exemplary implementation, contain controls for navigating the views and for obtaining measurement information. In an exemplary implementation, the menus 152 may include Volume Navigation controls 160 that allow an inspector to identify the axial length, current segment length, etc., of the component under evaluation. The Volume Navigation controls may also allow the inspector to scroll along the axial length using suitable positioning tools such as sliders, scales, data entry boxes, etc.

The menus may also include Channel controls 162 that allow the user to fuse together one or more sets of data. The data may originate from different sensors of the same non-destructive examination method. As another example, the data sets may come from one or more different non-destructive examination methods as described more fully herein. In the illustrative example, the inspector can quickly fuse channels of data using a checkbox style approach to data selection. However, other forms of data fusion may be implemented. The inspector may also be able to select Fusion Options 164. In the illustrative example, the Fusion Options 164 defines how channels of data are to be combined, e.g., based upon average data, peak data, etc. Other processing techniques may alternatively be implemented. Moreover, different techniques may be implemented for the fusion of different types of data, as the application dictates. The menus may also provide Volume Info 166, which provides measurements of the areas selected by the inspector in the various views 154A-154D.

According to various aspects of the present invention, the computer processor 56 may automatically transform the acquired non-destructive examination data by rendering, in response to inspector selection, the visualization based upon a selection of one of non-destructive examination data from a single non-destructive examination sensor associated with a single non-destructive examination method, non-destructive examination data from multiple non-destructive examination sensors associated with a single non-destructive examination method, where the multiple sensor data is fused into the same volumetric representation for display in at least one view, and non-destructive examination data from at least one non-destructive examination sensor associated with at least two non-destructive examination methods, where each sensor data is fused into a single volumetric representation for display in at least one view. For example, an inspector evaluating a rotor bore may cause the software to render the visualization by fusing Eddy Current inspection data to Ultrasonic inspection data.

As noted above, further manipulations may be implemented by moving the cross-hairs 158 in one or more views. In this regard, the cross-hairs in each view may be tied together so that movement in one view automatically updates the views in each of the views. Still further, although four views 154A-154D are illustrated for purposes of illustration, alternative arrangements may be implemented and/or the number of views may be manipulated by the inspector. For example, the inspector may be able to zoom into a single view thus maximizing the resolution of the display device 62 to show the details of a single view, e.g., the 3-D view. Moreover, in a 3-D view, e.g., the 3-D view 154D, the inspector may be able to rotate the view so as to be able to observe the image from any desired perspective.

Figure 6:
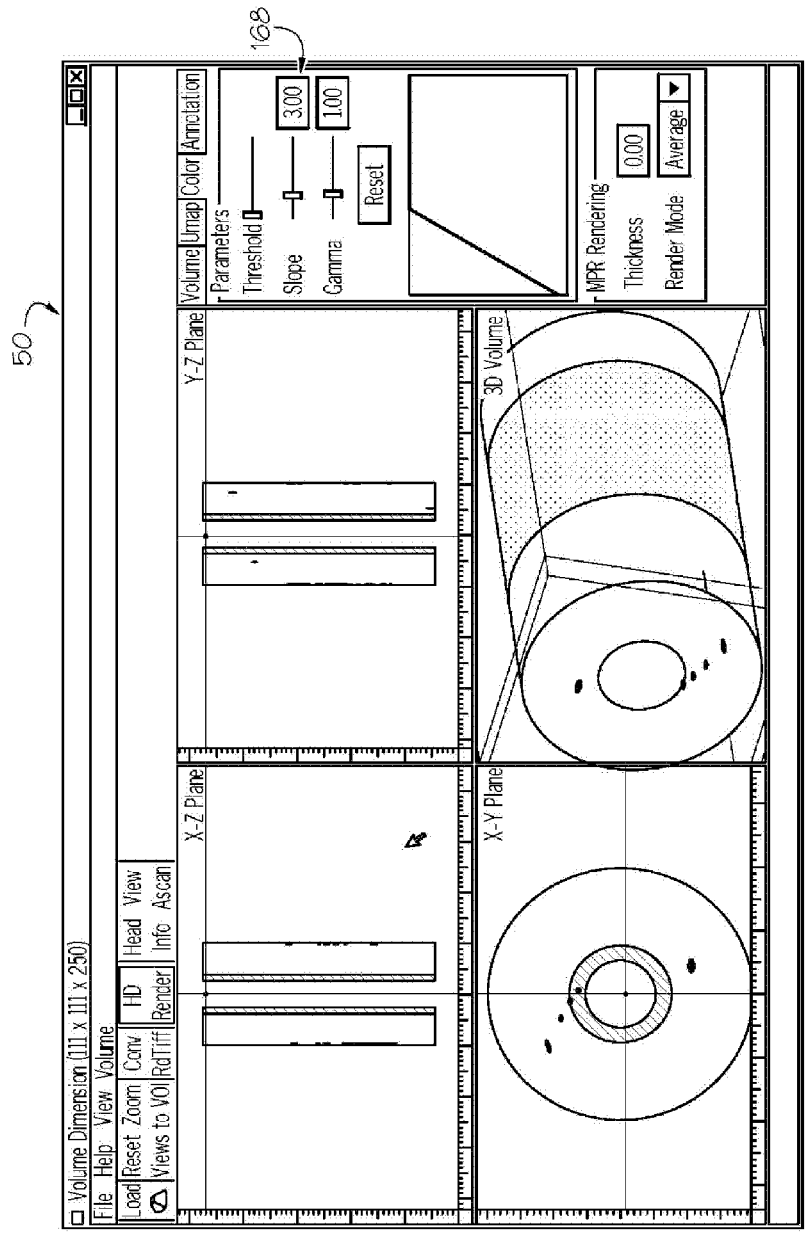
FIG. 6 is an exemplary screen shot of a user interface screen for performing component inspections according to further aspects of the present invention.
Figure 6A:
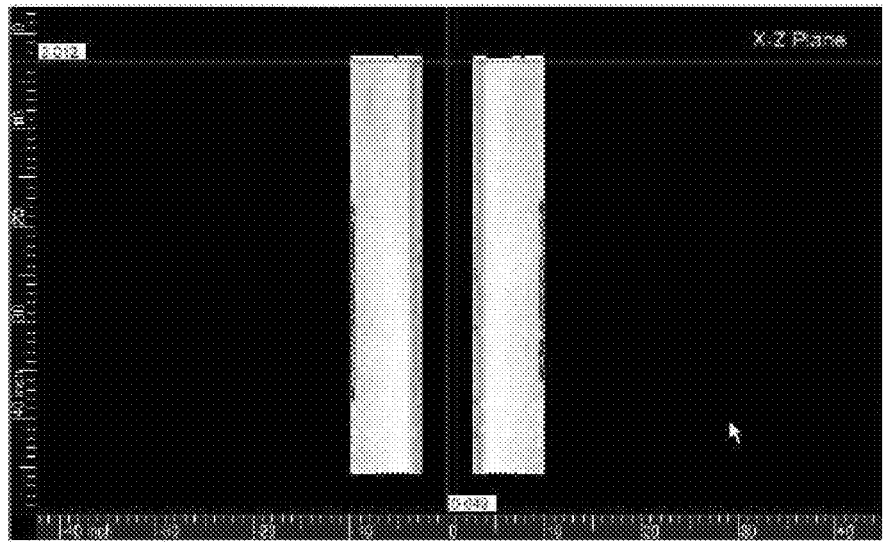
FIG. 6A is a graphic illustration of the view of the X-Z plane in the screen shot of FIG. 6.
Figure 6B:
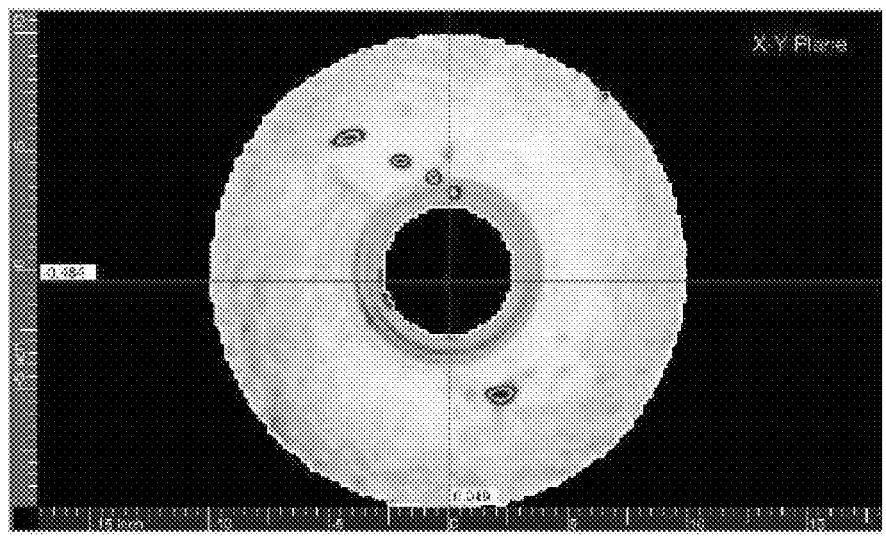
FIG. 6B is a graphic illustration of the view of the X-Y plane in the screen shot of FIG. 6.
Figure 6C:
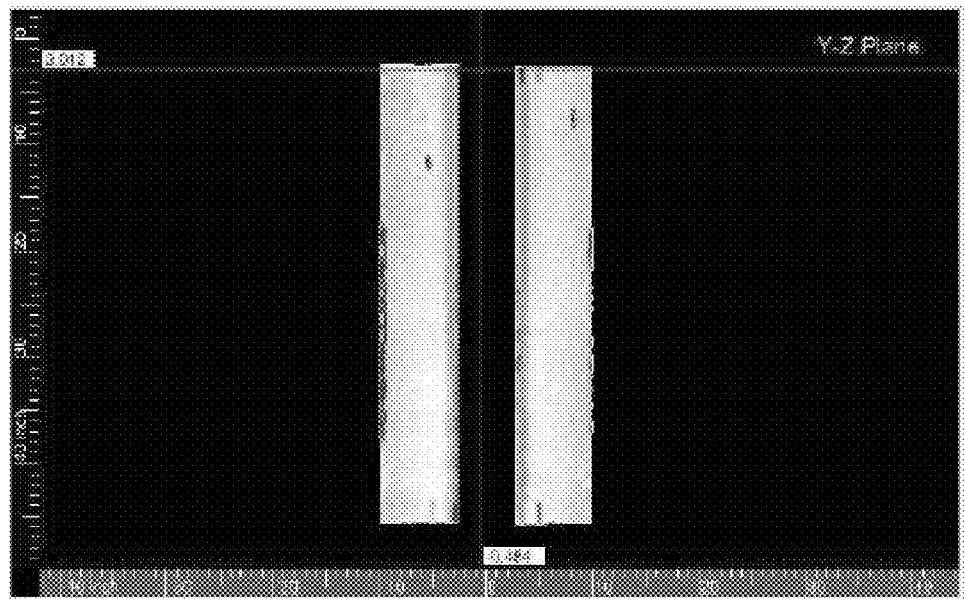
FIG. 6C is a graphic illustration of the view of the Y-Z plane in the screen shot of FIG. 6.
Figure 6D:
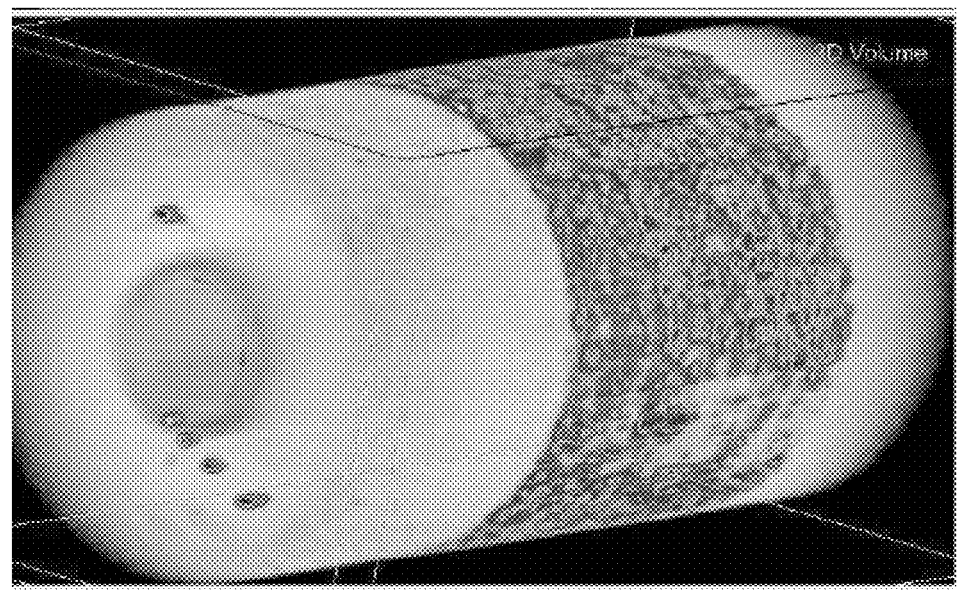
FIG. 6D is a graphic illustration of the view of the 3D Volume plane in the screen shot of FIG. 6.

Referring to FIG. 6, still further menu options may provide tools 168 for manipulating the images. In this regard, the inspector may utilize image processing to manipulate image properties to manipulate the visual appearance of features in the visualization. For example, the illustrative exemplary menu includes a Color Tab, which provides menu options to define image processing tools such as Threshold, Slope, Gamma, Rendering tools, etc. Other tools such as contrast, brightness, etc. may also be provided, depending for example, upon the specific application. The utilization of such tools may be utilized to make certain features more or less apparent for visual inspection as may be seen by comparing FIGS. 5A to 6A; 5B to 6B; 5C to 6C and 5D to 6D.

With reference to FIGS. 5 and 6 generally, FIG. 5 illustrates an exemplary view of a display that shows 4 panes including three panes each showing a 2-D representation of the component under evaluation and a pane showing a 3-D rendering of the component under evaluation. FIG. 6 illustrates the same data as represented in FIG. 5. However, the inspector has manipulated image parameters to identify features of interest. For example, the inspector may have manipulated the threshold, slope, gamma or other image characteristic of the display rendering of the component under evaluation. As illustrated, the ability of detect discontinuities is not limited to surface flaws. Rather, sub-surface conditions are inspected.

The inspector may also perform engineering analysis based upon the views of the data. In this regard, the engineering analysis may be manual or automated. In either approach, certain analysis methodologies are implemented to determine the location of indications, their relative location to each other, and their bounding size. This information is then further used to perform integrity analysis of the component under inspection. As such, this analysis may include engineering calculations, finite element analysis, crack propagation and growth analysis, etc.

Figure 7:
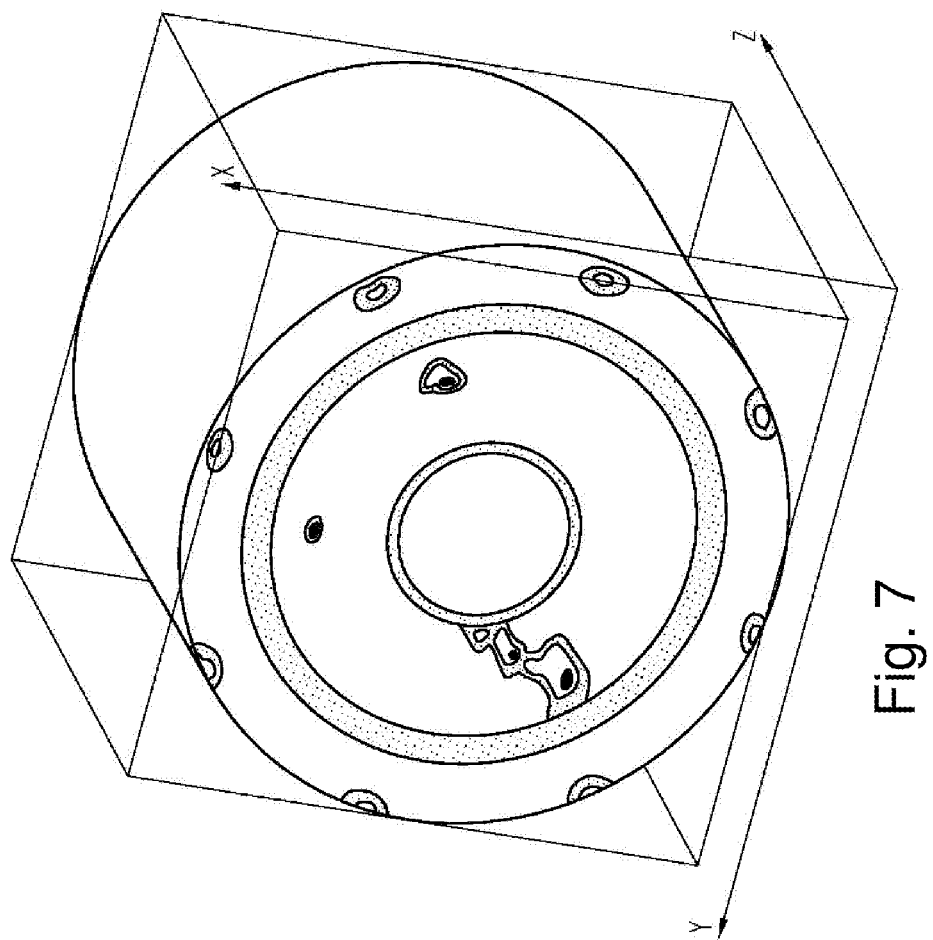
FIG. 7 is another view for performing component inspections according to still further aspects of the present invention.
Figure 7A:
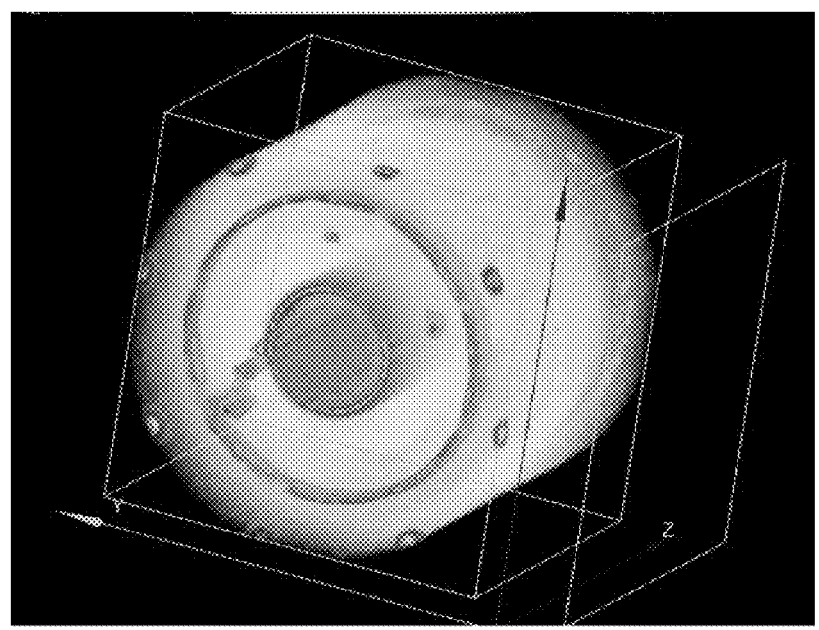
FIG. 7A is a photographic illustration of the view of the 3D Volume plane in the screen shot of FIG. 7.

Still further, the inspector may perform high-resolution analysis of the component. For example, referring to FIG. 7, the inspector may perform a high resolution analysis by zooming into a feature of interest associated with the volumetric representation of the component, by defining a three-dimensional boundary around the feature of interest and by manually manipulating the bounded three-dimensional view of the selected feature. The view can then be zoomed into the bounded volume so that a more precise granularity of inspection may be performed at only the locations of interest. The inspector may also manipulate the orientation of the view. Still further, the operator can alter any parameters, e.g., the Volume information, the Color information, etc., interactively with selecting views and perspectives of the visualized data. As such, the relationship of one discontinuity to other discontinuities, including nearby discontinuities that might otherwise have been confused as a single discontinuity, can be determined.

According to various aspects of the present invention, automatically transforming the acquired non-destructive examination data further comprises displaying the volumetric representation of the component in a first view comprising a three-dimensional representation of the image and displaying the volumetric representation of the component in at least one additional view that comprises a two-dimensional representation of the component. In this regard, the graphical user interface may be utilized to interact with the processor to control the displayed representation in each view such that navigation in any displayed view automatically navigates to the same location in each displayed view.

Moreover, the inspector may acquire a three-dimensional component model of the industrial component. In this regard, the software may automatically transform the acquired non-destructive examination data by positioning the transformed non-destructive examination data in a three-dimensional space within the three-dimensional component model.

Still further, as noted in greater detail herein, the software may retrieve operating history data, environment data or material data that is utilized in combination with the acquired non-destructive examination data to determine the integrity of the industrial component. Still further, the software may aggregate the acquired non-destructive data with previously collected non-destructive examination data for the same industrial component if such data exists.

The interaction facilitated by the framework also provides a feedback mechanism to clock the collection of the actual raw data. For example, sensor data from an ultrasonic time of flight measurement, commonly referred to an "A-Scan", can be displayed at a point of interest. As such, specific and accurate engineering decisions may be made. Accordingly, the framework may provide useful and valuable interaction even during the time of collecting and sensing the non-destructive evaluation data, e.g., by allowing the user to "steer" the data collection process to derive non-destructive evaluation data that is most likely to contain meaningful examination content.

Where the non-destructive examination data collected with reference to an industrial component under evaluation is acquired using multiple non-destructive evaluation methods, the visualization in either 2-D or 3-D may fuse the acquired non-destructive examination data into a single view. For example, Eddy Current inspection data may be fused to Ultrasonic inspection data to facilitate the inspector identifying discontinuities of interest. Still further, non-destructive examination data may also and/or alternatively be fused with other types of data that characterize the component under evaluation. Still further, the fusing of data may be implemented by selectively aggregating the data so that an inspector may freely switch between single inspection method visualization and fused inspection method visualization, e.g., using channel controls 162 or any other appropriate method of temporarily selecting which test methods should appear within the visualization.

Moreover, according to various aspects of the present invention, near instantaneous, on site display of data may be implemented, including the performance of engineering analysis. Alternatively, non-destructive examination data may be collected for subsequent evaluation. In preparing the non-destructive examination results, it may be necessary to prune or otherwise reduce the amount of data under consideration. The various aspects of the present invention can perform such actions.

According to aspects of the present invention, the framework of the various aspects of the present invention may be utilized for bore inspection. The bore surface of a rotor may be evaluated to investigate high stress areas. Thus, a procedure may be implemented to look for discontinuities that may result in cracking due to operational service stress. Magnetic particle or eddy current testing of the bore surface may also be performed.

According to various aspects of the present invention, ultrasonic non-destructive evaluation methods, e.g., A-scan, C-scan, etc., may be utilized to slice down non-destructively through the component under evaluation. Moreover, the collected data may be collected and presented in a meaningful manner. For example, the provision of a three-dimensional view provides a measure of data intensity, e.g., amplitude, etc., as well as location. Thus, relative orientation to other detected discontinuities may be ascertained.

Still further, the non-destructive examination data may be mapped onto a hypothetical component model. Thus, for example, if the component under test comprises a circular surface, it can be mapped onto a hypothetical annular tube. In this regard, the component under test can be evaluated from the inside out or outside in. Moreover, an inspector evaluating the data can manipulate the views of the non-destructive examination data. For example, the inspector may draw a box around, flag or otherwise annotate an indication of a discontinuity in the views provided on the display. Discontinuities can be detected, for example, using finite element analysis.

In traditional non-destructive examination processes, the inspector is required to spend considerable amount of time after the inspection for data reduction. However, according to various aspects of the present invention, data reduction and manipulation required to visualize the data is automated. That is, ultrasonic and other non-destructive examination test results, which may not typically be image-based, are manipulated for visualization. As such, immediate display of the collected data is possible.

According to various aspects of the present invention, representations of collected data can be displayed for visual analysis in a manner that facilitates evaluation of the component. In this regard, visual display tools are provided, which form the basis for engineering, structural and/or metallurgical evaluation. Moreover, the visual display may be interactive to further facilitate inspection of the associated component under evaluation.

Various aspects of the present invention may be embodied as systems or computer-implemented methods. Furthermore, various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system. The computer program product aspects of the present invention may have computer usable or computer readable program code portions thereof, which are stored together or distributed, either spatially or temporally across one or more devices.

The hardware described more fully herein may vary, depending on the implementation. For example, the above described components may be integrated or implemented as separate components. The depicted example is not meant to imply architectural limitations with respect to the present invention. Moreover, the above configuration is shown by way of illustration and not by way of limitation. As such, other processing system configurations may be implemented. For example, a data processing system suitable for storing and/or executing program code may include at least one processor coupled directly or indirectly to memory elements, e.g., through a system bus or other suitable connection. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function (s). In some alternative implementations, the functions noted in the blocks may occur out of the order noted in the figures. For example, two blocks shown in succession may, in fact, be executed substantially concurrently or in the reverse order. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method for assessing and interpreting non-destructive examination data collected with regard to a component under evaluation, comprising:

acquiring non-destructive examination data that is collected with reference to an industrial component under evaluation, wherein the non-destructive examination data includes a plurality of measurands that are derived from at least one non-destructive examination method that measures conditions of the component under evaluation;

acquiring position information that associates the collected measurands to corresponding positions associated with the component under evaluation;

automatically transforming by a computer processor the acquired measurands and corresponding position information, which comprise data that is not in a format representative of an image of the component under evaluation into a visualization defined by a volumetric representation that is rendered on at least one display device as at least one view representative of the component under evaluation; and utilizing a graphical user interface that interacts with the processor to navigate the volumetric representation to investigate the integrity of the industrial component including non-surface conditions thereof by:

adjusting at least one view of the visualization to display a representation of at least a portion of the component under evaluation;

distinguishing indications of discontinuities within at least one view that represents flaws associated with the structure of the industrial component under evaluation that are not of interest from flaws of interest to an inspector;

utilizing the graphical user interface to measure at least one of a size, location and orientation of each detected indication of a discontinuity that is of interest to the inspector; and wherein automatically transforming by a computer processor the acquired the acquired measurands and corresponding position information further comprises:
displaying the volumetric representation of the component in a first view comprising a three-dimensional representation of the image; and
concurrent with displaying the first view, displaying the volumetric representation of the component in a plurality of concurrent additional views that each comprises a two-dimensional representation of the component and each concurrent additional view having respective coordinates and magnification parameters that are independently selectable; and
utilizing a graphical user interface that interacts with the processor to navigate the volumetric representation further comprises controlling the displayed representation in each displayed view such that navigation in any displayed view automatically navigates to the same location in each displayed view;

wherein:
automatically transforming by a computer processor the acquired measurands and corresponding position information further comprises:
rendering, in response to inspector selection, the visualization based upon a selected one of:
non-destructive examination data from a single non-destructive examination sensor associated with a single non-destructive examination method;
non-destructive examination data from multiple non-destructive examination sensors associated with a single non-destructive examination method, where the multiple sensor data is fused into the same volumetric representation for display in at least one view; and
non-destructive examination data from at least one non-destructive examination sensor associated with at least two non-destructive examination methods, where each sensor data is fused into a single volumetric representation for display in at least one view; and
rendering, in response to inspector selection, the visualization based upon a selected one of:
non-destructive examination data from at least one non-destructive examination sensor associated with at least two non-destructive examination methods comprises fusing Eddy Current inspection data to Ultrasonic inspection data; and
utilizing a graphical user interface that interacts with the processor to navigate the volumetric representation further comprises:
displaying a user selectable control, having a first choice and a second choice, each choice related to a respective one of two different methods of fusing the Eddy Current inspection data and the Ultrasonic inspection data;
receiving user input selecting one of the first choice or the second choice; and
fusing the Eddy Current inspection data and the Ultrasonic inspection data according to the method associated with the selected choice.

2. The method according to claim 1, further comprising:
utilizing image processing to manipulate image properties to manipulate the visual appearance of features in the visualization.

3. The method according to claim 1, further comprising:
performing a high resolution analysis by:
zooming into a feature of interest associated with the volumetric representation of the component;
defining a three-dimensional boundary around the feature of interest; and
manually manipulating the bounded three-dimensional view of the selected feature.

4. The method according to claim 1, further comprising transforming and displaying the volumetric representation of the component as the non-destructive examination data is gathered so that the inspector can visualize the non-destructive examination data as it is being gathered.

5. The method according to claim 1, wherein acquiring non-destructive examination data that is collected with reference to an industrial component under evaluation comprises:
performing at least one of a Penetrant Testing (PT), a magnetic particle inspection, an Eddy Current inspection, an Ultrasonic inspection, an acoustic thermography inspection, an ultrasonic phased array inspection, induction thermography inspection and acoustic emissions inspection.

6. The method according to claim 1, further comprising:
retrieving at least one of operating history data, environment data or material data that is utilized in combination with the acquired non-destructive examination data to determine the integrity of the industrial component.

7. The method according to claim 1, further comprising:
aggregating the acquired non-destructive data with previously collected non-destructive examination data for the same industrial component if such data exists.

8. A computer program product to assess and interpret non-destructive examination data collected with regard to a component under evaluation, comprising:
a non-transitory computer usable storage medium having computer usable program code embodied therewith, the computer usable program code comprising:
computer usable program code configured to acquire non-destructive examination data that is collected with reference to an industrial component under evaluation, wherein the non-destructive examination data includes a plurality of measurands that are derived from at least one non-destructive examination computer program product that measures conditions of the component under evaluation to produce a plurality of measurands;
computer usable program code configured to acquire position information that associates the collected measurands to corresponding positions associated with the component under evaluation;
computer usable program code configured to automatically transform the acquired measurands and corresponding position information, which comprise data that is not in a format representative of an image of the component under evaluation into a visualization defined by a volumetric representation that is rendered on at least one display device as at least one view representative of the component under evaluation;
computer usable program code configured to implement a graphical user interface that interacts with the processor so that an inspector can navigate the volumetric representation to investigate the integrity of the industrial component including non-surface conditions thereof;
computer usable program code configured to adjust at least one view of the visualization to display a representation of at least a portion of the component under evaluation;
computer usable program code configured to distinguish indications of discontinuities within at least one view that represents flaws associated with the structure of the of the industrial component under evaluation that are not of interest from flaws of interest to an inspector;

computer usable program code configured to measure at least one of a size, location and orientation of each detected indication of a discontinuity that is of interest to the inspector; and wherein the computer usable program code configured to automatically transform the acquired measurands and corresponding position information further comprises:

computer usable program code configured to display the volumetric representation of the component in a first view comprising a three-dimensional representation of the image; and computer usable program code configured to display, concurrently with display of the first view, the volumetric representation of the component in a plurality of concurrent additional views that each comprises a two-dimensional representation of the component and each concurrent additional view having respective coordinates and magnification parameters that are independently selectable; and wherein:

the computer usable program code configured to navigate the volumetric representation further comprises computer usable program code configured to control the displayed representation in each displayed view such that navigation in any displayed view automatically navigates to the same location in each displayed view;

the computer usable program code configured to automatically transform the acquired measurands and corresponding position information further comprises:

computer usable program code configured to render, in response to inspector selection, the visualization based upon a selected one of:

non-destructive examination data from a single non-destructive examination sensor associated with a single non-destructive examination computer program product;

non-destructive examination data from multiple non-destructive examination sensors associated with a single non-destructive examination computer program product, where the multiple sensor data is fused into the same volumetric representation for display in at least one view; and non-destructive examination data from at least one non-destructive examination sensor associated with at least two non-destructive examination computer program products, where each sensor data is fused into a single volumetric representation for display in at least one view;

the computer usable program code configured to render, in response to inspector selection, the visualization based upon a selected one of:

non-destructive examination data from at least one non-destructive examination sensor associated with at least two non-destructive examination computer program products comprises fusing Eddy Current inspection data to Ultrasonic inspection data; and the computer usable program code configured to automatically transform the acquired measurands and corresponding position information further comprises:

computer usable program code configured to:

display a user selectable control, having a first choice and a second choice, each choice related to a respective one of two different methods of fusing the Eddy Current inspection data and the Ultrasonic inspection data;

receive user input selecting one of the first choice or the second choice; and fuse the Eddy Current inspection data and the Ultrasonic inspection data according to the method associated with the selected choice.

9. The computer program product according to claim 8, further comprising:

computer usable program code configured to perform image processing to manipulate image properties to manipulate the visual appearance of features in the visualization.

10. The computer program product according to claim 8, further comprising:

computer usable program code configured to perform a high resolution analysis by providing:

computer usable program code configured to zoom into a feature of interest associated with the volumetric representation of the component;

computer usable program code configured to define a three-dimensional boundary around the feature of interest; and computer usable program code configured to manually manipulate the bounded three-dimensional view of the selected feature.

11. The computer program product according to claim 8, further comprising computer usable program code configured to transform and display the volumetric representation of the component as the non-destructive examination data is gathered so that the inspector can visualize the non-destructive examination data as it is being gathered.

12. The computer program product according to claim 8, wherein the computer usable program code configured to acquire non-destructive examination data that is collected with reference to an industrial component under evaluation comprises:

computer usable program code configured to acquire non-destructive examination data from at least one of a Penetrant Testing (PT), a magnetic particle inspection, an Eddy Current inspection, an Ultrasonic inspection, an acoustic thermography inspection, an ultrasonic phased array inspection, induction thermography inspection and acoustic emissions inspection.

13. The computer program product according to claim 8, further comprising:

computer usable program code configured to retrieve at least one of operating history data, environment data or material data that is utilized in combination with the acquired non-destructive examination data to determine the integrity of the industrial component.

14. The computer program product according to claim 8, further comprising:

computer usable program code configured to aggregate the acquired non-destructive data with previously collected non-destructive examination data for the same industrial component if such data exists.

* * * * *